US012307648B2

(12) United States Patent
Bendall et al.

(10) Patent No.: US 12,307,648 B2
(45) Date of Patent: May 20, 2025

(54) AUTOMATED TURBINE BLADE TO SHROUD GAP MEASUREMENT

(71) Applicant: Baker Hughes Oilfield Operations LLC, Houston, TX (US)

(72) Inventors: Clark A. Bendall, Skaneateles, NY (US); Matthew W. Pankow, Camillus, NY (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 247 days.

(21) Appl. No.: 17/462,166

(22) Filed: Aug. 31, 2021

(65) Prior Publication Data
US 2022/0108435 A1    Apr. 7, 2022

Related U.S. Application Data

(60) Provisional application No. 63/086,783, filed on Oct. 2, 2020.

(51) Int. Cl.
*G06T 7/00* (2017.01)
*G06T 7/13* (2017.01)
*G06T 7/521* (2017.01)

(52) U.S. Cl.
CPC .............. *G06T 7/0006* (2013.01); *G06T 7/13* (2017.01); *G06T 7/521* (2017.01);
(Continued)

(58) Field of Classification Search
None
See application file for complete search history.

(56) References Cited

U.S. PATENT DOCUMENTS 11,663,712 B2    5/2023  Bendall et al.
2008/0109195 A1  5/2008  Dischinger et al.
(Continued)

FOREIGN PATENT DOCUMENTS

CN    107806961 A  *  3/2018  ............ G01M 1/122
EP      3324150 B1     9/2019
(Continued)

OTHER PUBLICATIONS

Neupane, Bijay, Zeyar Aung, and Wei Lee Woon. "A new image edge detection method using quality-based clustering." Proceedings of the 10th IASTED International Conference on Visualization, Imaging, and Image Processing. 2012. (Year: 2012).*
(Continued)

*Primary Examiner* — Vincent Rudolph
*Assistant Examiner* — Meredith Taylor
(74) *Attorney, Agent, or Firm* — Mintz, Levin, Cohn, Ferris, Glovsky and Popeo, P.C.

(57) ABSTRACT

Data is received which can characterize a two-dimensional image and a set of three-dimensional surface points. The two-dimensional image can characterize at least a tip of a blade and a portion of a shroud, and the three-dimensional surface points can characterize the tip of the blade and the portion of the shroud. A first location of an edge of the blade and a second location of a surface of the shroud can be determined based on the data. A distance between the first location of the edge of the blade and the second location of the surface of the shroud can be determined based on the data. The distance can be provided. Related apparatus, systems, techniques and articles are also described.

17 Claims, 12 Drawing Sheets

(52) U.S. Cl.
CPC ...... *G06T 2200/04* (2013.01); *G06T 2200/24* (2013.01); *G06T 2207/10028* (2013.01); *G06T 2207/30164* (2013.01)

(56) References Cited

U.S. PATENT DOCUMENTS

| | | |
|---|---|---|
| 2015/0317816 A1 | 11/2015 | Bendall et al. |
| 2017/0309057 A1 | 10/2017 | Vaganov |
| 2017/0337705 A1* | 11/2017 | Bendall .................. G01B 11/24 |
| 2018/0094537 A1* | 4/2018 | Pulisciano ............ H04N 13/20 |
| 2018/0209296 A1 | 7/2018 | Deascanis et al. |
| 2018/0270465 A1* | 9/2018 | Bendall ................ G01N 21/954 |
| 2019/0019305 A1 | 1/2019 | Bendall |
| 2022/0130032 A1 | 4/2022 | Bendall et al. |

FOREIGN PATENT DOCUMENTS

| | | | |
|---|---|---|---|
| WO | WO-2010097076 A1 * | 9/2010 | ............. G06T 17/20 |
| WO | 2022087617 A1 | 4/2022 | |

OTHER PUBLICATIONS

International Search Report and Written Opinion Received for PCT International Application No. PCT/US2021/071968, mailed on Feb. 15, 2022, 10 pages.

\* cited by examiner

AUTOMATED TURBINE BLADE TO SHROUD GAP MEASUREMENT

RELATED APPLICATION

This application claims priority under 35 U.S.C. § 119(e) to U.S. Provisional Application No. 63/086,783, filed Oct. 2, 2020, the entire contents of which are hereby expressly incorporated by reference herein.

BACKGROUND

The operation of turbines over time can lead to dimensional changes in different components of the turbine. Such dimensional changes can reduce performance and efficiency of the turbine or result in rubs and wear that may increase risk in operation. Maintenance must be routinely performed to ensure the turbine is functioning at an acceptable level. Inspections are also performed by operators and inspectors to monitor critical dimensions after use.

One such inspection that can be performed is the measurement of the turbine shroud gap. This gap rests between a turbine blade and a turbine shroud, and the gap can increase or decrease over time due to blade wear or elongation, shroud expansion, contraction, or warping, or if the turbine shaft shifts relative to the shroud. The gap dimensions are also a critical parameter on newly manufactured turbines to ensure that specified performance characteristics are met. A larger gap can lead to inefficiencies in operation by allowing additional air to leak through the gap, and a smaller gap can lead to the blade tip rubbing against the shroud causing damage or wear. Inspection of the shroud gap is often performed by inserting a borescope into a borescope port to capture image data of the shroud gap. From there, an operator of the borescope can manually select data points on the various features of the turbine to obtain measurement values. However, if the image quality is poor, or the image contrast around the areas of interest is not high enough, selection and 2-D or 3-D mapping of the locations of interest can be prone to error. Moreover, mere manual selection can be prone to error as well. Less experienced operators may incorrectly place measurement cursors. The gap size often varies along the length of the blade tip, and trying to determine, for example, the minimum, maximum, and average gap size through manual placement of individual measurement cursors can be a very time-consuming process. Furthermore, the 3D data generated by small-diameter borescope systems often has gaps or artificial noise anomalies in the vicinity of the blade edge or on the shroud that may prevent placement of measurement cursors in the desired location or may reduce the accuracy of measurements made using those 3D data coordinates directly as would typically be done with manual measurements.

SUMMARY

In an aspect, data is received which can characterize a two-dimensional image and a set of three-dimensional surface points. The two-dimensional image can characterize at least a tip of a blade and a portion of a shroud, and the three-dimensional surface points can characterize the tip of the blade and the portion of the shroud. A first location of an edge of the blade and a second location of a surface of the shroud can be determined based on the data. A distance between the first location of the edge of the blade and the second location of the surface of the shroud can be determined based on the data. The distance can be provided.

One or more of the following features can be included in any feasible combinations. For example, one or more two dimensional structured-light images of the blade and the portion of the shroud can be acquired by a borescope inserted into a turbine, or by any similar means. The two-dimensional image can be a white-light image, and it can be acquired by a borescope or equivalent. The set of three-dimensional surface points can be determined from the one or more acquired structured-light images.

The first location can include a line characterizing the edge of the blade, and the second location can include a plane characterizing the surface of the shroud.

Determining the first location of the edge of the blade can involve additional steps. For example, pixels located in the blade edge region can be identified based on the data characterizing the two-dimensional image. The identified pixels can be clustered to form segments. A final blade edge segment can be determined from the formed segments, and the final blade edge segment can be further determined based on at least one of a number of pixels and the intensity values of the pixels. The final blade edge segment can be then filtered. A three-dimensional edge point can be determined for each point in the filtered final blade edge segment by at least projecting a position of a point in the filtered final blade edge segment onto a fitted three-dimensional blade surface.

Determining the distance can include additional steps including computing a distance from each three-dimensional edge point to a second location. Furthermore, a minimum distance, a maximum distance, and an average distance can be determined.

Providing the distance can include, for example, displaying the two dimensional image and first graphical icons characterizing the first location and second location within the two-dimensional image and within a first graphical user interface display space. The three-dimensional surface points and second graphical icons characterizing the first location within the two-dimensional image and the second location within the two-dimensional image can be displayed within a second graphical user interface display space.

The reception of the data can be performed by a borescope inserted into a port of a turbine that includes the blade and the shroud.

Providing the distance can further include various steps. Instruction can be received from a turning tool and by a borescope, indicating that the blade has rotated within a field of view of a camera of the borescope. In response to receiving the instruction, data characterizing the two-dimensional image can be received, and the first and the second location, and the distance could be determined.

An instruction can be transmitted to a turning tool to rotate another blade into a field of view of a camera of the borescope. Data can be received which can characterize a two-dimensional image and a set of three-dimensional surface points. The two-dimensional image can characterize at least a tip of a blade and a portion of a shroud, and the three-dimensional surface points can characterize the tip of the blade and the portion of the shroud. A first location of an edge of the blade and a second location of a surface of the shroud can be determined based on the data. A distance between the first location of the edge of the blade and the second location of the surface of the shroud can be determined based on the data. The distance can be provided.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
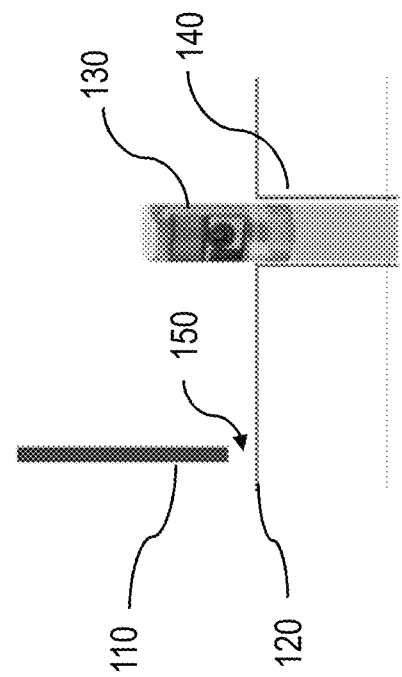
FIG. 1 depicts a side view of a portion of an exemplary turbine shroud gap measurement setup.

When inspecting the distance or gap between a blade and a shroud within a turbine, a borescope can be inserted into a port within the turbine to visually inspect the gap using, for example, illumination and a camera to acquire an image of the gap. The acquired image can then be inspected to determine the distance. But where the illuminator on the borescope is located at a similar or lesser distance from the shroud than the viewing optics (e.g., the camera), there may be no shadow visible below the blade. This can result in very little contrast between the blade and shroud in the acquired image making it difficult to determine the location of an edge of the blade with precision. If the illuminator is located further from the shroud than the viewing optics (e.g., camera), a visible shadow band may be cast on the shroud, creating a significant contrast in the acquired image along the blade edge improving the ability to determine the location of an edge of the blade with precision.

Accordingly, some implementations of the current subject matter include using a two dimensional image of the blade and shroud to determine the location of the edge of the blade. The information obtained from the two dimensional image can be combined with a set of three dimensional surface points, which can be obtained for example using a structured light sensor of the borescope, to locate the edge of the blade and a surface of the shroud. Locating the edge of the blade and a surface of the shroud can enable an automated assessment of the distance or gap between the blade and the shroud. By utilizing two dimensional images captured using both diffuse normal inspection light and structured light patterns projected from different positions on the borescope to determine the location of the edge of the blade and combining this information with three dimensional surface points, the location of the edge of the blade can be more precisely determined, thereby enabling improved blade-shroud gap measurements.

In some implementations, the borescope can be in communication with a turning tool that can rotate turbine blades into position for inspection by the borescope. By synchronizing the borescope with the turning tool, inspection processes can be performed more efficiently.

Turbine inspection can be routinely performed to ensure safety and performance of the turbine. Operators and inspectors can rely on capturing image data via a borescope or similar device to inspect a turbine shroud gap. The image data can contain both 2-D and 3-D data characterizing the region of interest. Within the image data, a processing algorithm can process 2-D and 3-D data to automatically identify a turbine blade region and a turbine shroud region, map the edge of the blade with edge points and the location of the shroud surface, and compute the distance between the blade edge points and the shroud surface. These distances can then be provided on a display along with a 2-D image, a rendered point cloud view, or similar method of presenting results.

An example processing algorithm can include a series of basic steps. These steps may include identifying continuous surfaces using the set of 3-D surface points. Blade and shroud surfaces can be selected from the identified surface points. A blade edge region can then be determined in the 2-D images where the blade edge likely exists. Edge detection can be performed to identify possible blade edge pixels in the blade edge region that may indicate the presence of the blade edge. Groups of closely-spaced possible blade edge pixels can be connected to create possible blade edge segments. Blade edge segments which are in possible disagreement with higher probability segments (e.g. segments with more connected points or stronger detection edge values) can be removed to create a final blade edge segment set. 2-D position filtering can be applied to the points in the final blade edge segment set to determine a set of filtered 2-D edge points. For each filtered 2-D edge point, a 3-D fitting of the blade surface in the vicinity of the point can be performed and a 3-D edge point can be determined by projecting the filtered 2-D edge point position onto the fitted 3-D blade surface. Those 3-D points on the blade surface determined to be very noisy may be excluded from this fitting to reduce the impact of the noise on the computed 3-D edge point position. Thus, the determined 3-D edge points will generally have 3-D coordinates that do not exist in the set of 3-D surface points, and graphical icons representing the 3-D blade edge points may be visibly offset from the 3-D surface points in a rendered point cloud image.

The distance from each 3-D edge point to a shroud surface can be computed, which can be determined by fitting a plane or curved surface to 3-D points included in the identified shroud surface. The 3-D edge point having the minimum and maximum distances from the shroud surface can be identified, and the average of the distances from all the 3-D edge points to the shroud surfaces can be computed. The locations of the filtered 2-D edge points, the minimum point location, the maximum point location, and the numerical minimum, maximum and average distances can be displayed on the white light image. The locations of the 3-D edge points, the minimum point location, and the maximum point location can be displayed on a rendered 3-D representation of the 3-D surface points. A cursor can be displayed at the minimum and maximum point locations and a user can be allowed to adjust those positions. The system can provide advisory messages if the blade edge could not be fully mapped, if there is uncertainty about the accuracy of the results (e.g. due to low blade edge contrast or noisy 3-D data), or if the minimum, maximum, or average fall outside of pre-programmed ranges.

In some embodiments, the above steps are performed after an operator of the borescope has manually initiated an image capture operation. In some embodiments, the borescope is communicatively connected to a turning tool that is connected to the turbine such that the borescope is notified when a blade of the turbine is moved into a pre-determined position within the view of the borescope camera, and the borescope system automatically initiates the image capture and performs the above processing steps. In some embodiments, the borescope system may compile a table of the minimum, maximum, and/or mean results for multiple images captured during an inspection and output that table as a file or as part of an inspection report. Blades that have minimum, maximum, and/or mean results outside predetermined limits or outside a nominal range for the inspection can be identified.

In some embodiments, a two-dimensional image may be captured while the blade and shroud are illuminated with a diffuse normal inspection light from a light source such as a white LED or arc lamp. Such an image may be referred to as a normal inspection image or a white-light image. In some embodiments, a single white light image is processed. In some embodiments, more than one white light image can be captured at different brightness levels and processed in combination to improve the blade edge mapping when the brightness of the image varies significantly over the width of the blade edge. In some embodiments, multiple images can be captured at different brightness levels and then merged to create a high-dynamic range image that is used in the blade edge detection steps. In some embodiments, the white-light image may be acquired using stereoscopic optics to produce a stereoscopic image using a single image sensor or using two or more separate image sensors to produce one or more pairs of stereoscopic images such that the parallax information can be used to generate a set of three-dimensional surface points.

In some embodiments, a plurality of projected pattern measurement images, or structured-light images, may be acquired and processed. The acquisition of the structured-light images may include projection of structured-light patterns, such as dots, lines, or phase-shifted sinusoidal lines, onto the edge portion of the blade and the surface of the shroud. The structured-light image(s) may be processed to generate a set of three-dimensional surface points. The structured-light images may also be processed to determine two-dimensional pixel coordinates characterizing the edge of the blade. The structured-light images may be combined through averaging, summing, and the like, to reduce the contrast of the patterns, which may otherwise interfere with the blade edge detection. In some embodiments, points on the blade that are within a pre-programmed distance range from the shroud are masked to provide a quick visual pass/fail indication. In another embodiment, points on the blade outside a pre-programmed distance range from the shroud are masked. In some embodiments, points on the blade at a pre-programmed distance from the shroud are masked. In some embodiments, a plane is shown in a 3-D point cloud view at a pre-programmed distance from the shroud.

In some embodiments, the image capture process can utilize a 2-D white light image captured with normal inspection illumination, typically from a white LED, and a set of 3-D surface points, wherein each 3-D surface point has a corresponding pixel in the white light image or images. The 3-D surface points can be generated from one or more measurement images captured by the borescope system. In some cases, the measurement images may be the white light image or images, e.g., as may be with stereoscopic images. In some cases, the measurement images may be structured-light images that are captured with the normal inspection illumination off and a pattern-projection illuminator on (e.g. with the Baker Hughes 3D Phase Measurement). For example, the borescope may include at its distal end or in a detachable tip at its distal end one or more light emitters (e.g. LEDs, VCSELs, and the like), positioned behind a glass window on which an opaque pattern is deposited such that when an emitter is powered, a line pattern is projected onto the viewed surface. If the normal inspection illumination exit point is at a similar or lesser distance from the shroud than the viewing optics, there may be no shadow visible below the blade in the white light image or images. This can result in little contrast between the blade and shroud in certain areas. Light from a pattern-projection illuminator, if located further from the shroud than the viewing optics, as is often the case, may result in a dark shadow cast by the blade that is visible from the position of the viewing optics and provides significantly more contrast along the blade edge than may exist in the white-light image or images. Thus the structured-light image(s) may be used in conjunction with the white-light image(s) to more precisely or more completely map the edge of the blade in the two-dimensional images.

FIG. 1 depicts a side view of a measurement setup 100. A borescope 130, or similar device, can enter a turbine via a borescope port 140 to obtain imaging access to a turbine shroud gap 150. The shroud gap 150 lies between a turbine blade 110 and a turbine shroud portion 120. The borescope 130 can be used to image the shroud gap 150 to facilitate inspection and measurement of the turbine shroud gap 150 by mapping various points along an edge of the turbine blade 110 and the surface of the turbine shroud portion 120.

Figure 2:
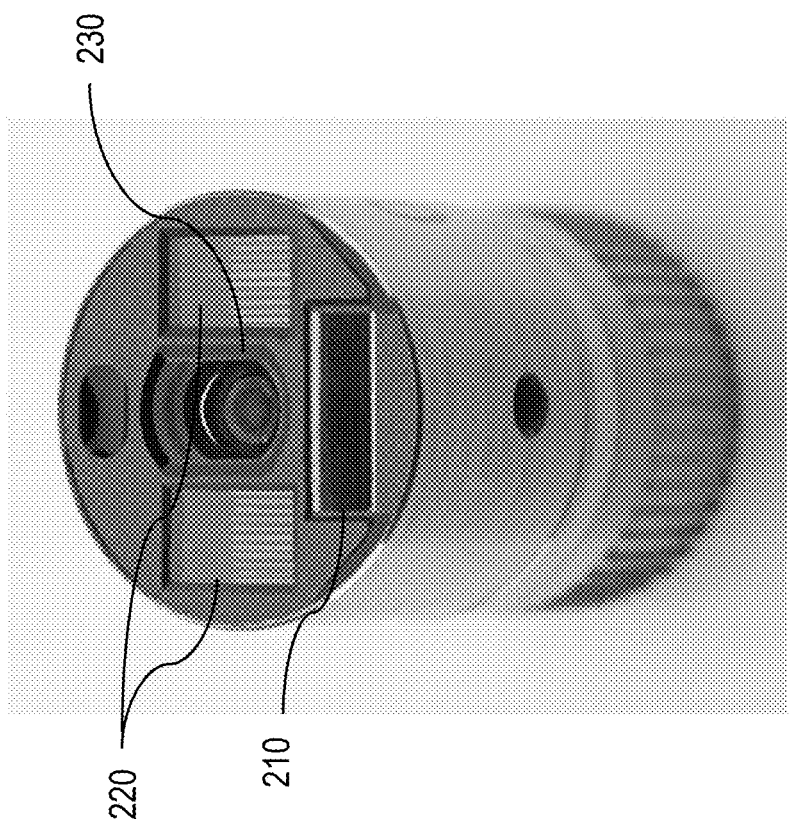
FIG. 2 depicts a forward-view detachable phase tip.

FIG. 2 depicts an exemplary forward-view detachable borescope 3D Phase Measurement tip (phase tip) 200, which can be placed on the distal end of a borescope in preparation for imaging and measurement of turbine shroud gaps. The phase tip 200 can include various light emission sources for accurate imaging and measurement, including a normal inspection light emission source 210 and a structured light emission source 220. The normal inspection light emission source 210 can be a lightbulb, flash bulb, LED, or similar light source, which may be included in the tip or delivered to the tip using fiber optics, for normal inspection imaging. The structured light emission source 220 can include any light source capable of emitting a structured light pattern. The structured light emission source 220 can provide a higher contrast between a turbine blade and a turbine shroud than the normal inspection light emission source 210 depending on their locations relative to the blade and shroud. Furthermore, stereoscopic imaging techniques may be used in conjunction with the phase tip 200, and the normal inspection light emission source 210 and/or the structured light emission source 220.

Emission sources fixed to a phase tip, such as the front-view detachable phase tip 200 may be used individually or in conjunction with one another, discretely or simultaneously, to allow for imaging of a turbine shroud gap to take place via viewing optics 230 coupled to an image sensor (not shown) or similar image capturing device. Additionally, images can be captured via viewing optics 230 using the normal inspection emission source 210 and/or the structured light emission sources 220 in series at varying degrees of brightness, and these images can be summed together to create a higher dynamic-range image of the captured region of interest. An image captured via the viewing optics 230 in reliance on the simultaneous emission of normal light and structured light, such as from the normal inspection light emission source 210 and the structured light emission sources 220 can be combined together to generate a summed image.

Figure 3:
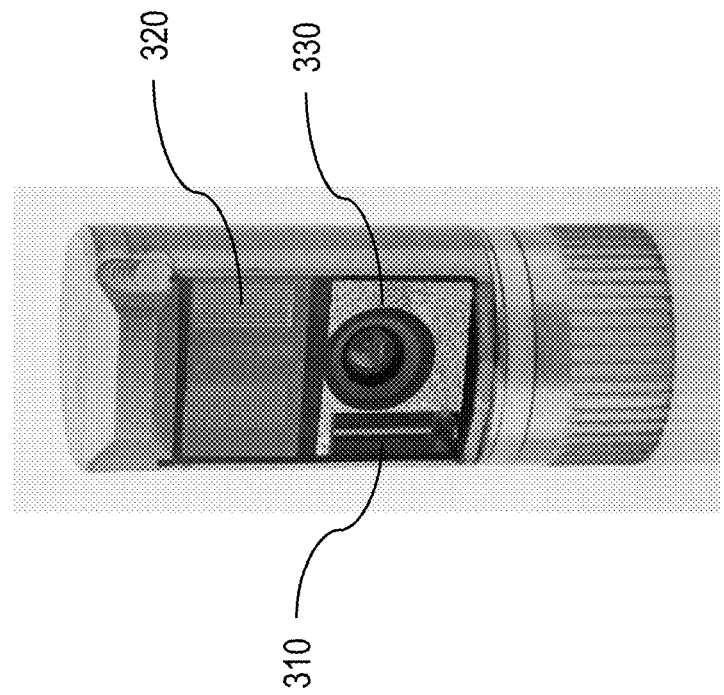
FIG. 3 depicts an exemplary side-view detachable borescope phase tip.

FIG. 3 depicts an exemplary side-view detachable borescope phase tip 300, which can be placed on the distal end of a borescope in preparation for imaging and measurement of turbine shroud gaps. The side-view detachable borescope phase tip 300 can include any and all of the features of the front-view detachable borescope phase tip 200, including a normal inspection light emission source 310, a structured light emission source 320, and viewing optics 330 coupled to an image sensor (not shown), or any equivalent structure useful for capturing images of turbines known in the art.

Figure 4:
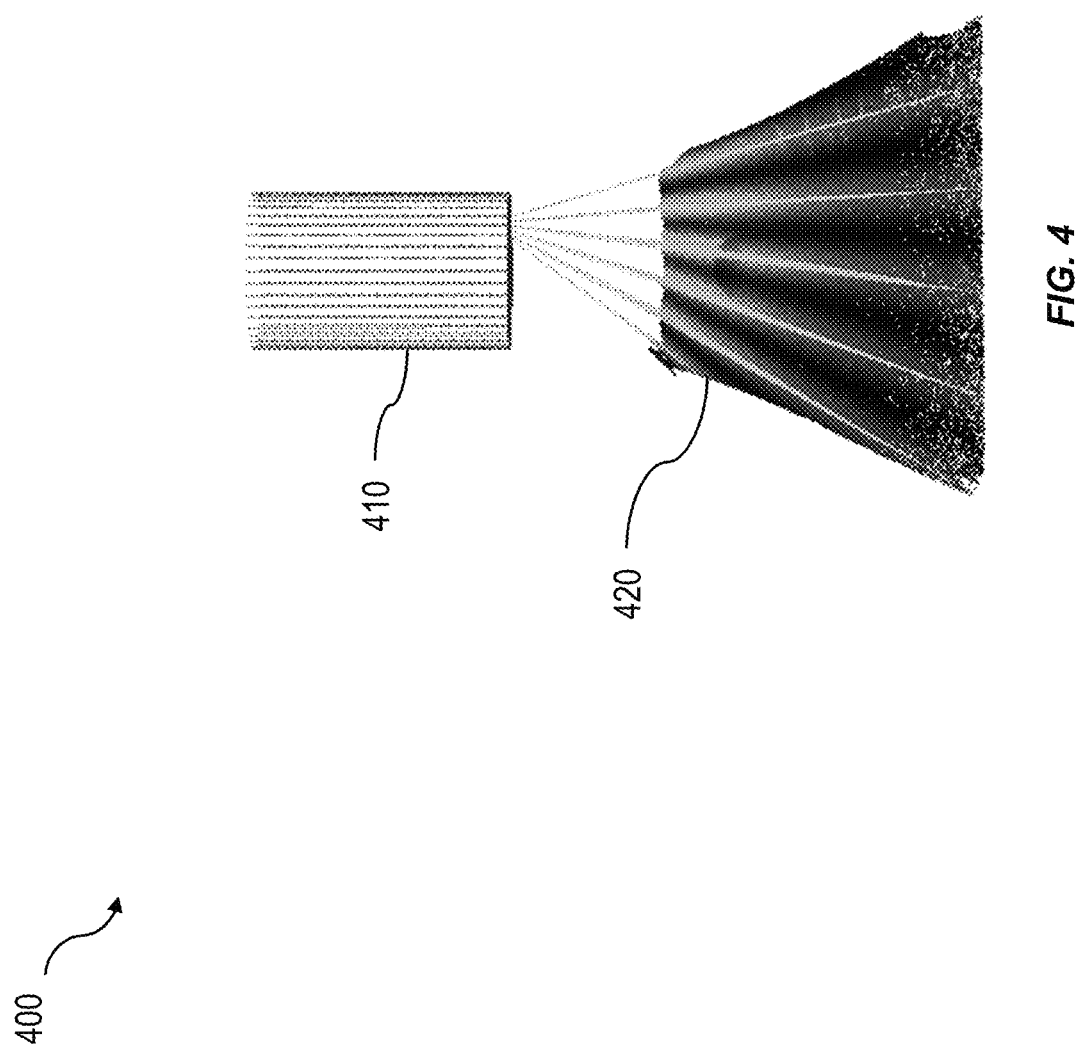
FIG. 4 depicts a structured light emission system.

FIG. 4 depicts a structured light emission system 400 featuring a structured light emission source 410 projecting a structured light emission 420. The emission source 410 can be a borescope phase tip, such as the front-view phase tip 200 or the side-view phase tip 300, or similar device.

Figure 5:
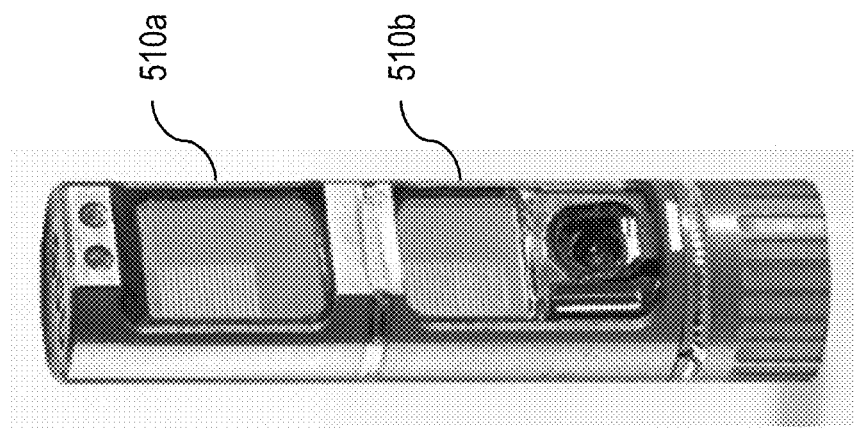
FIG. 5 depicts an extended side-view detachable phase tip.

FIG. 5 depicts an exemplary side-view extended range detachable borescope phase tip 500, which can be placed on the distal end of a borescope in a similar manner as the front-view phase tip 200 and the side-view phase tip 300. The extended range phase tip 500 can include any and all of the features of the front-view detachable borescope phase tip 200 or the side-view detachable borescope phase tip 300, or similar device. In addition, the extended range phase tip 500 can feature more than one structured light emission source 510a and 510b, and the use of an extended range phase tip can allow for a wider range of illumination angles when capturing image data.

Figure 6:
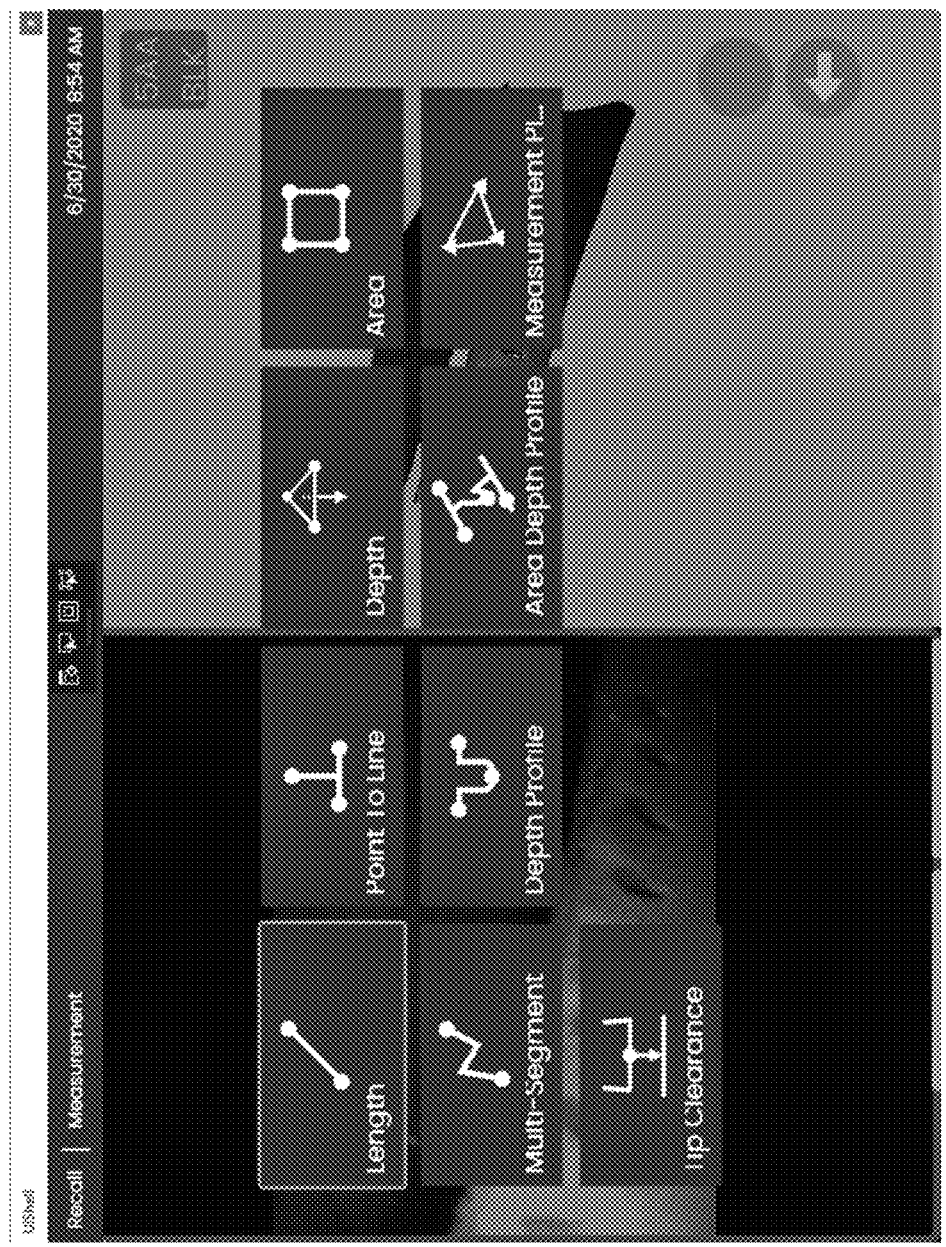
FIG. 6 depicts an exemplary display menu of possible tools to perform a shroud gap measurement.

FIG. 6 depicts an exemplary display menu 600 of possible tools to perform a shroud gap measurement or other types of measurements.

Figure 7:
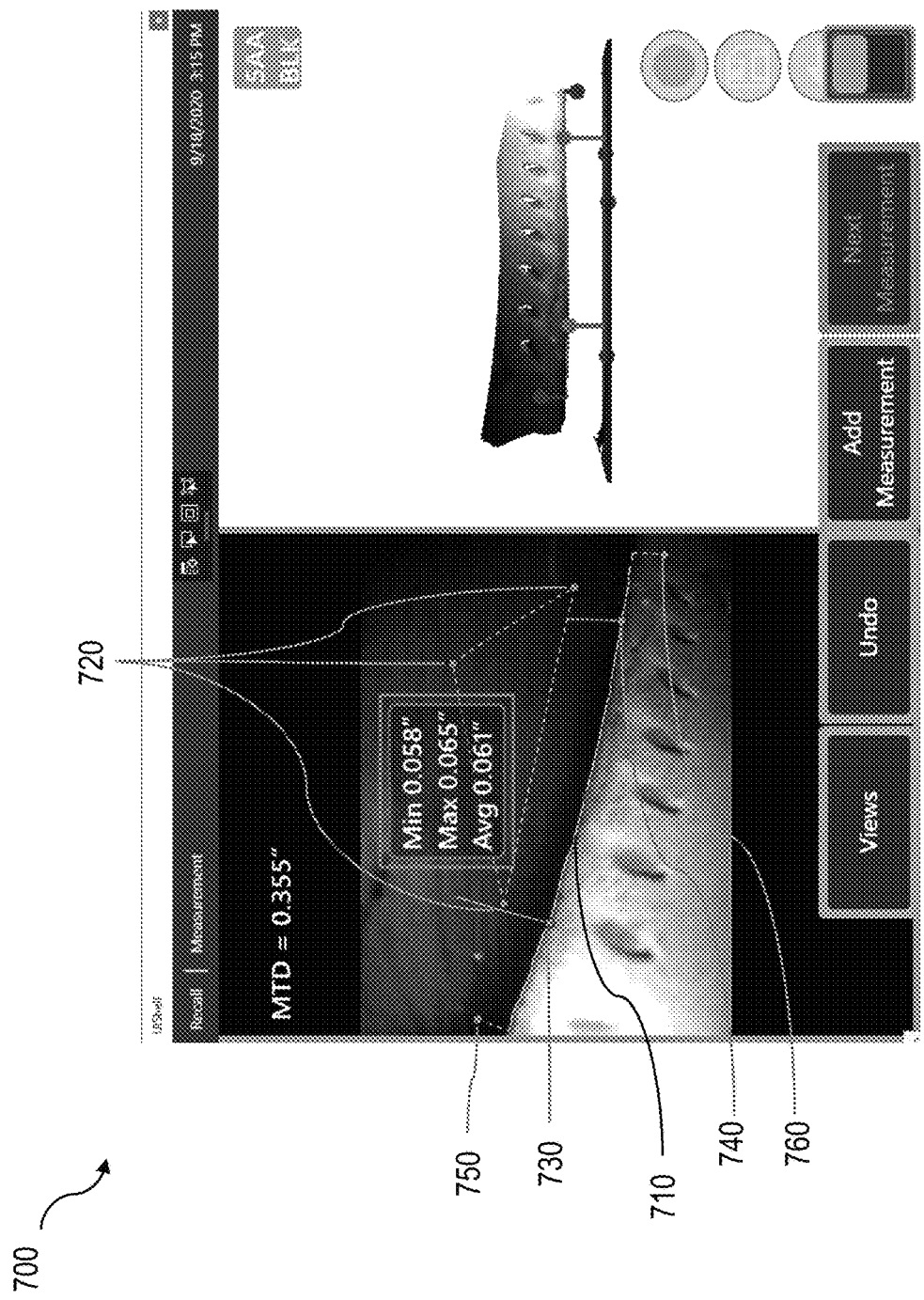
FIG. 7 depicts an exemplary display showing line mapping and distance measurement.

FIG. 7 depicts an exemplary display 700 showing blade edge mapping and shroud gap measurement. The left region of the display 700 depicts captured image data of a turbine shroud gap with mapped blade edge pixels 710, along with several measurement values, including a maximum, a minimum, and an average. Three shroud cursors 720, are automatically placed on 3-D surface points that lie on or very near a plane determined for the shroud. The user may adjust shroud cursors 720 to alter the determined shroud plane and thus the determined measurement values. Cursors 730 and 740 indicate the locations of the identified minimum and maximum distance points on the blade edge. Cursors 750 and 760 bound the portion of the mapped blade edge that is used for the minimum, maximum, and average shroud gap determinations and may be adjusted by the user to exclude portions of the blade edge. The right region of the display 700 shows a rendered 2-D image of a 3-D space (point cloud view) that includes a set of 3-D surface points characterizing the tip of the blade and the portion of the shroud along with graphical icons showing the locations of determined 3-D blade edge points and the 3-D locations associated with the various cursors shown on the 2-D image in the left region. The minimum and maximum distances between the mapped edge and the mapped shroud are marked at two locations by line segments normal to the mapped shroud surface. The process of rendering the point cloud view includes the application of a coordinate transformation that results in consistent initial relative positions and orientations of the blade and shroud such as the shroud being horizontal, the blade being above the shroud, and the view being approximately normal to the blade surface regardless of the orientations of the blade and shroud in the 2-D image in the left region. By consistently orienting the blade and shroud in the point cloud view, the user can more quickly inspect for sources of potential inaccuracy by reducing the time spent manually rotating the view using an input device such as a touch screen, joystick, or mouse. Other embodiments may show only the left region image and graphics or the right region image and graphics enlarged to fill the display.

The lower region of the display features various menu options to facilitate operating procedures, including mapping and measurement. The lower right region of the display features buttons to facilitate screen-recording, data capture, and saving of mapped and measured image data. The upper region of the image features additional buttons for altering settings preferences and/or performing different functions to aid in measurement.

Figure 8:
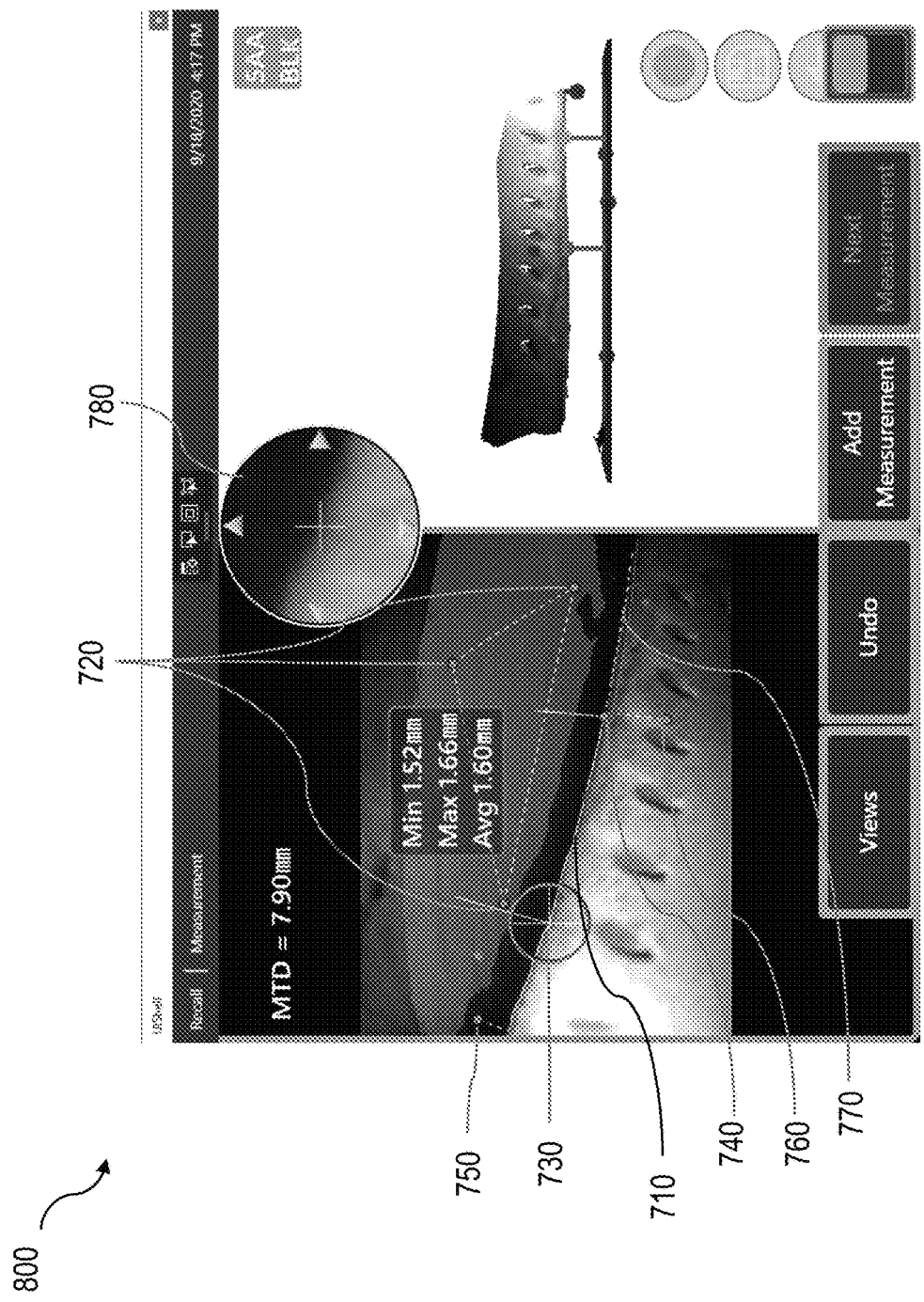
FIG. 8 depicts an exemplary display showing surface mapping and distance measurement.

FIG. 8 depicts an exemplary display 800 showing blade edge mapping and shroud gap measurement. The left region of the display 800 depicts captured image data of a turbine shroud gap with mapped blade edge pixels 710, along with several measurement values, including a maximum, a minimum, and an average, similar to the display of FIG. 7. The left image also depicts a shaded region highlighting pixels in the 2-D image that are associated with 3-D surface points that are less than a threshold distance from a plane that is automatically determined to represent the turbine shroud portion of interest for mapping and measurement. Cursor 760 has been manually moved from its position in FIG. 7 to exclude a portion of the blade edge pixels, shown by dashed line 770, from the determination of the minimum, maximum, and average shroud gap values. Cursor 740, which shows the location of the minimum shroud gap distance, has automatically been moved in response to the movement of cursor 760 as its previous location, shown in FIG. 7, was in the now excluded area. the right region of the display 800 shows a point cloud view similar to that of FIG. 7, but the graphical icons showing the locations of the blade edge points have different colors based on their inclusion in (magenta) or exclusion from (purple) the minimum, maximum, and average determination. Other embodiments may show only the left region image and graphics or the right region image and graphics enlarged to fill the display.

The central upper region includes a zoom window 780, which shows a magnified view of a portion of the 2-D image shown in the left region in the vicinity of an active cursor 730. Zoom window 780 allows the user to more easily verify that cursor 730 is located precisely on the edge of the blade. Some embodiments may allow the user to adjust the position of cursor 730 by tapping or clicking one of the arrows in zoom window 780. Similarly, other cursors may also be activated to allow position verification and/or adjustment via zoom window 780. The lower region of the display features various menu options to facilitate operating procedures, including mapping and measurement similar to those show in FIG. 7. The lower right region of the display features buttons to facilitate screen-recording, data capture, and saving of mapped and measured image data. The upper region of the image features additional buttons for altering settings preferences and/or performing different functions to aid in measurement.

Figure 9:
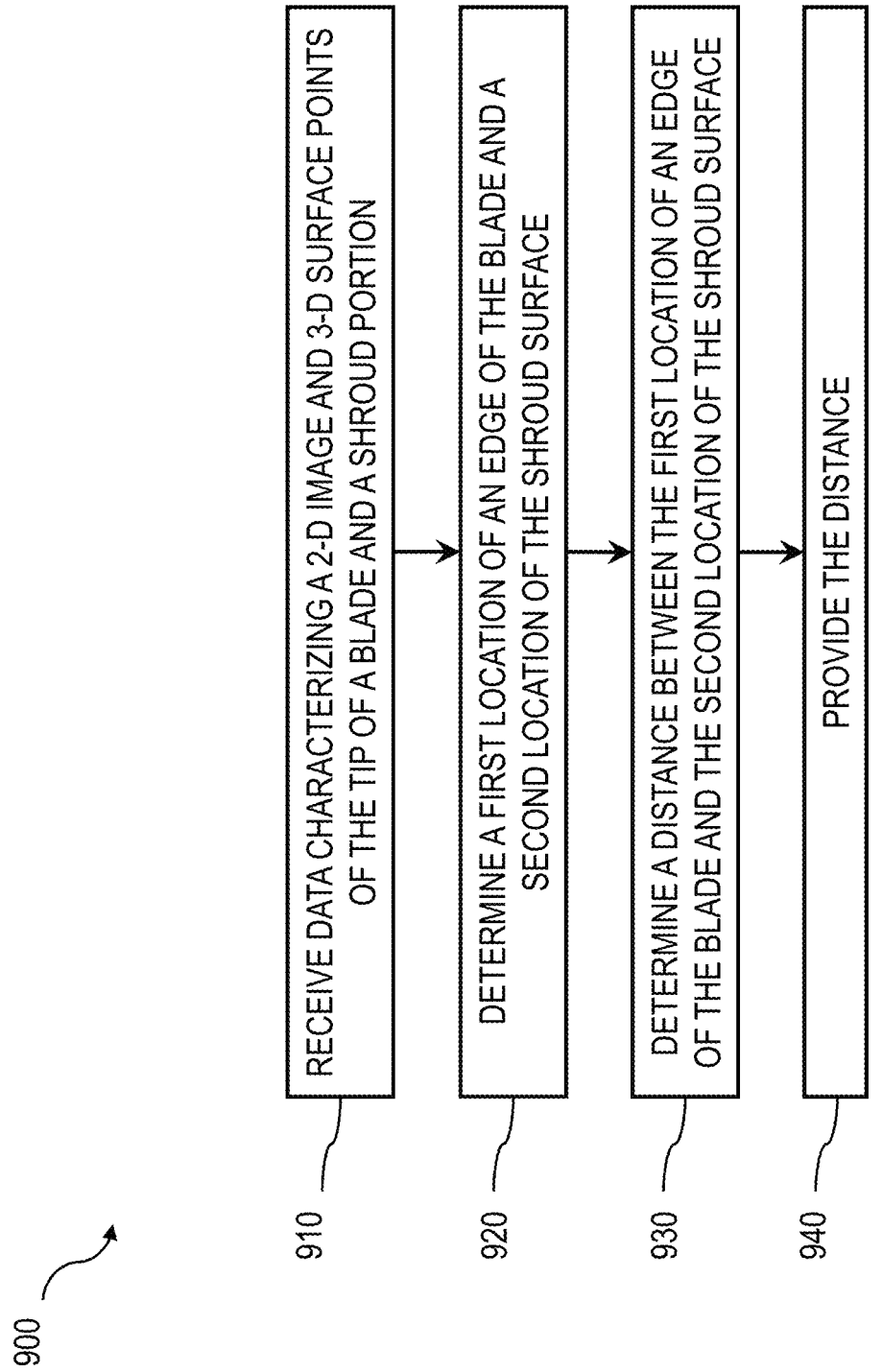
FIG. 9 is a process flow diagram depicting a automated shroud gap measurement process.

FIG. 9 is a process flow diagram 900 illustrating an example implementation of a turbine shroud gap measurement. The example process can facilitate inspection of turbine shroud gaps in a manner using higher-contrast image data to more accurately inspect and measure shroud gaps. Information containing the location of the edge of the blade can be determined using a two-dimensional image of the blade and shroud, and that information can be combined with a set of three-dimensional surface points, which can be obtained using structured light illumination, diffuse normal light illumination, or a combination of the two. These illuminations can be emitted from a borescope phase tip. The location of the edge of the blade can be more precisely determined using a combination of two-dimensional data combined with the three-dimensional surface points. Further, in some implementations, the borescope can be in communication with a turning tool that can rotate turbine blades into position for inspection by the borescope. Inspection processes can be performed more efficiently by synchronizing the borescope with the turning tool.

At 910, data can be received characterizing a 2-D image and 3-D surface points of the tip of a blade and a shroud portion. The data can be received from a borescope 130 set within a borescope port 140 to capture a view of a shroud gap 150 as set between a turbine blade 110 and a turbine shroud portion 120. This data can result from a captured image via a borescope 130, and the image can be captured using light emitted from the phase tip of the borescope. Example phase tips are illustrated in FIGS. 2, 3, and 5.

At 920, a first blade edge location and a second shroud surface location can be determined from the received image data. This can include identifying pixels located in a blade edge region, and/or clustering the identified pixels to form segments and based on the data characterizing the two-dimensional image. Further, this can include determining a final blade edge segment from the segments and based on a number of pixels within each segment and based on pixel intensity value. The blade edge segment can be filtered, and a three-dimensional edge point can be determined for each point in the filtered final blade edge segment by at least projecting a position of a point in the filtered final blade edge segment onto a fitted three-dimensional blade surface.

At 930, distances can be determined between the first location of the edge of the blade and the second location of the shroud surface, and these distances represent the turbine shroud gap. The distance can be determined by computing a distance from each three-dimensional edge point to the second location. Further, a minimum, maximum, and average distance can be determined.

At 940, the distance can be provided to a user via a display connected to the borescope system, or the distance can be stored within memory and compared to preset values. The two-dimensional image and first graphical icons characterizing the first location within the two-dimensional image and the second location within the two-dimensional image can be displayed within a first graphical user interface display space. The three-dimensional surface points and second graphical icons characterizing the first location within the two dimensional image and the second location within the two-dimensional image can be displayed within a second graphical user interface display space. In some implementations, the user can be alerted to insufficient measurement data, or a failure of the inspection.

Figure 10:
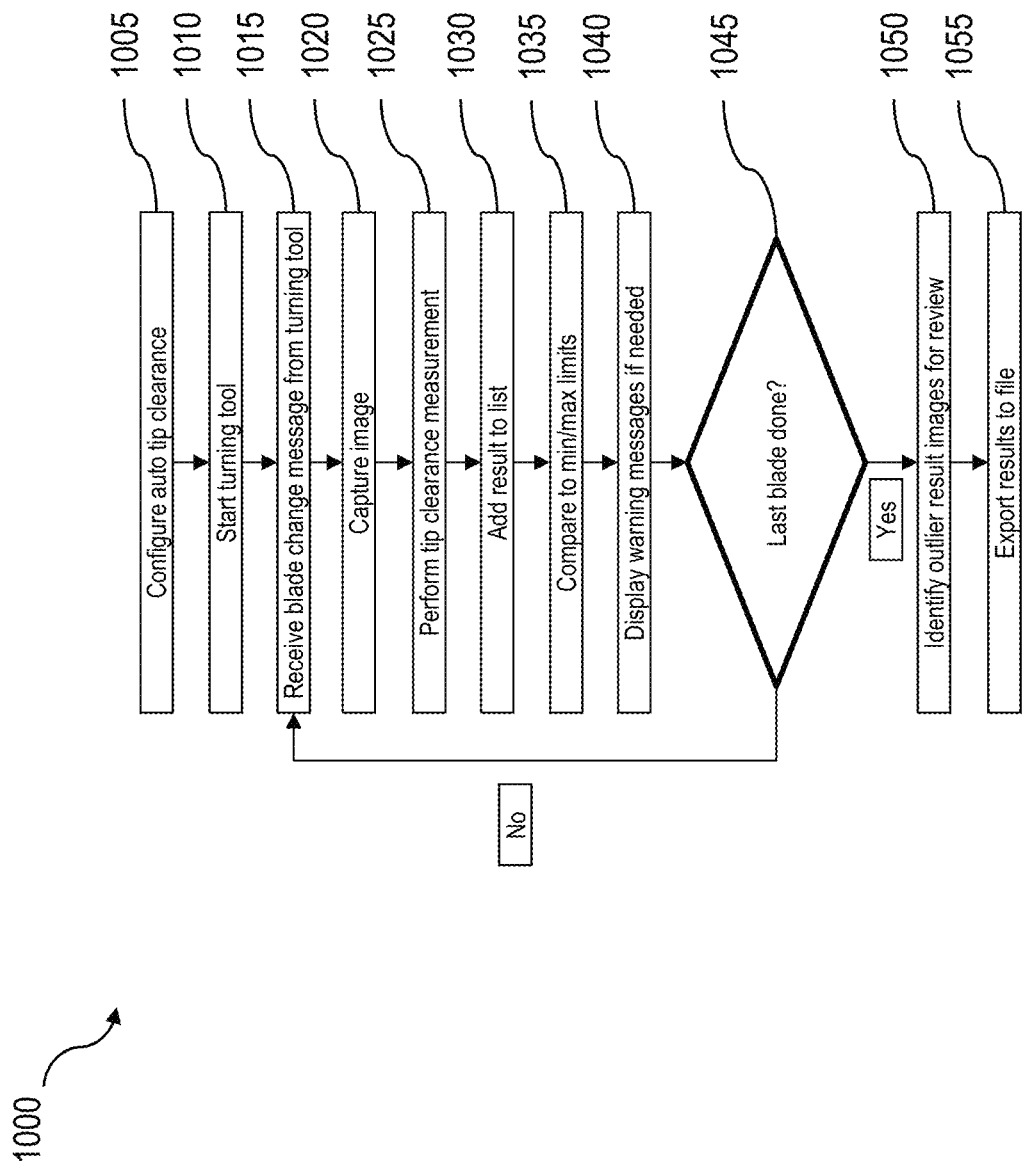
FIG. 10 is a process flow diagram depicting one-way communication between a borescope and a turning tool during shroud gap measurement.

FIG. 10 is a process flow diagram 1000 illustrating an example implementation of one-way communication between a borescope and a turning tool during turbine shroud gap inspection and measurement. The example implementation can allow for turbine shroud gap measurements to be made in succession as a turning tool rotates the turbine to bring an unmeasured turbine shroud gap into view of a borescope. The borescope can then receive instructions from the turning tool to begin the shroud gap measurement process.

At 1005, auto tip clearance is configured to set up the borescope in relation to the shroud gap in preparation for the measurement process.

At 1010, the turning tool is started to rotate the turbine to present a turbine blade and turbine shroud gap to the viewing port of the borescope.

At 1015, a blade change message is received from the turning tool to indicate to the borescope that a new turbine blade and shroud gap will be presented to the viewing port of the borescope for image capture, and shroud gap inspection and measurement.

At 1020, image data is captured containing a view of the turbine shroud, shroud gap, and turbine blade. The image data may contain 2-D image data and a set of 3-D surface points, or a set of 3-D surface points may be determined using the image data. The image data can be captured via a borescope phase tip 230, and illumination of the shroud gap, turbine blade, and turbine shroud can be performed by a normal inspection light emission source 210, a structured light emission source 220, or a combination thereof.

At 1025, tip clearance measurement is performed. The image data and 3-D surface points can be assessed to distinguish and map the turbine blade edge and the shroud surface, and a distance will be computed between the edge and the surface. That distance will represent the turbine shroud gap measurement at various locations for the respective turbine blade. The tip clearance measurement can be performed, for example, using the process described with reference to FIG. 9 above.

At 1030, the shroud gap measurement for the respective turbine blade is recorded to a list of measurements completed thus far. The list can be stored in memory while the inspection is being performed on the remaining blades.

At 1035, the recorded value, representing the shroud gap measurement, is compared to minimum and maximum limits set by the inspection operator and/or the industry.

At 1040, a warning message is displayed if the recorded value, when compared to minimum and maximum limits, is found to be at a value of concern.

At 1045, a system check is performed to determine whether the blade measured at 1025 is the last blade to be measured in the turbine. If the check returns a negative, indicating the blade most recently measured is not the last unmeasured blade of the turbine, the system will proceed to 1015 and continue with the measurement process. If the check returns a positive, indicating the blade most recently measured was the last unmeasured blade of the turbine, the system will proceed to 1050.

At 1050, images relating to image data which was deemed, by the system, to fall outside of the maximum and minimum limits of 1035, are identified for review by the system operator, inspector, or other figure.

At 1055, the results of the series of shroud gap measurements are exported to file.

Figure 11:
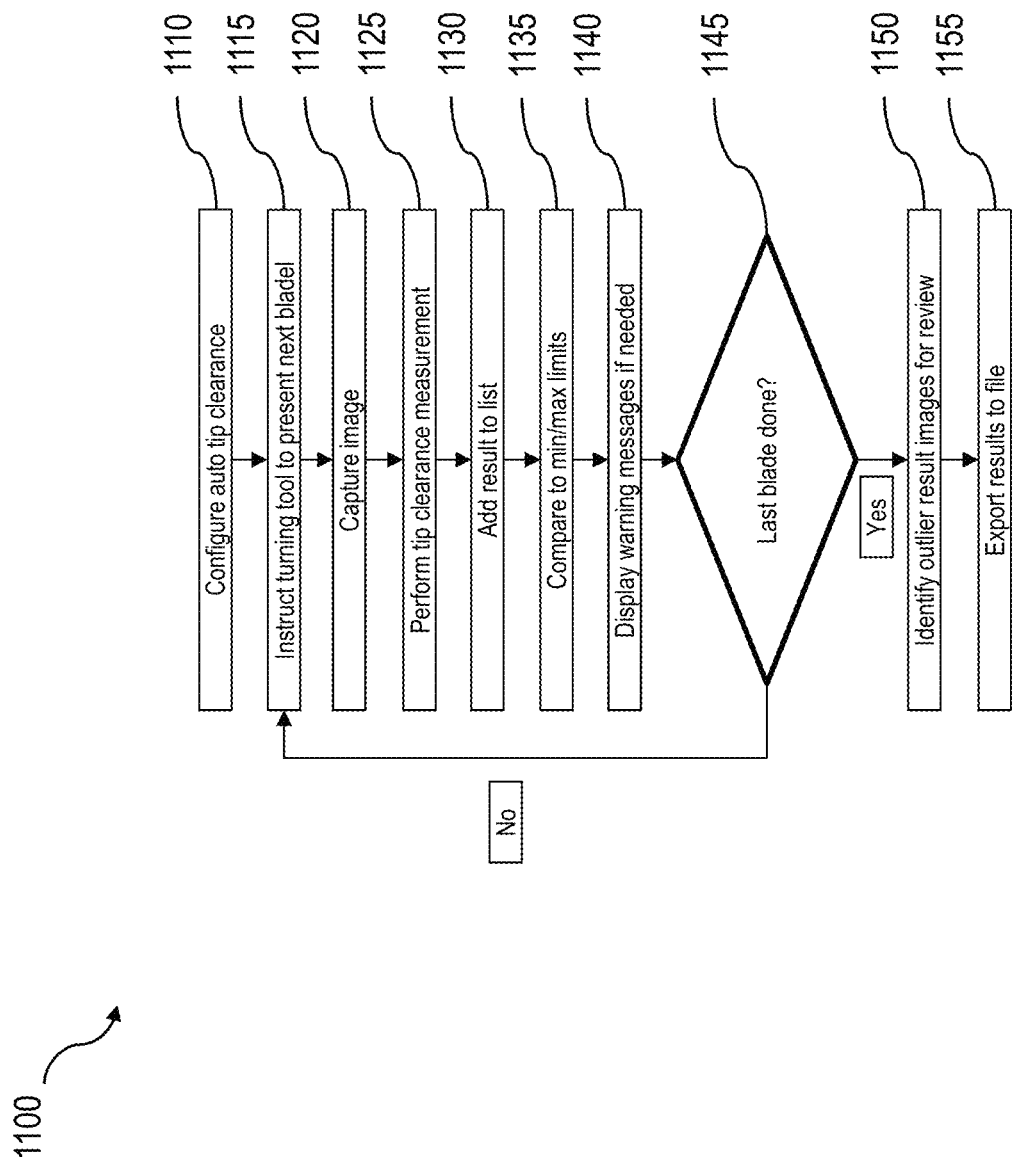
FIG. 11 is a process flow diagram depicting two-way communication between a borescope and a turning tool during shroud gap measurement.

FIG. 11 is a process flow diagram 1100 depicting two-way communication between a borescope and a turning tool during turbine shroud gap inspection and measurement. The example implementation can allow for turbine shroud gap measurements to be made in succession as a turning tool rotates the turbine to bring an unmeasured turbine shroud gap into view of a borescope. Communication occurs from the turning tool to the borescope and from the borescope to the turning tool.

At 1110, the turning tool is started to begin to rotate the turbine and present a turbine blade and turbine shroud gap to the viewing port of the borescope.

At 1115, a blade change message is received from the borescope by the turning tool to instruct the turning tool to present the next blade in sequence to the viewing port of the borescope for measurement.

At 1120, image data is captured containing a view of the turbine shroud, turbine gap, and turbine blade. The data may also contain 2-D image data and a set of 3-D surface points. The image data can be captured via a borescope phase tip camera 230, and illumination of the shroud gap, turbine blade, and turbine shroud can be performed by a normal inspection light emission source 210, a structured light emission source 220, or a combination thereof.

At 1125, tip clearance measurement is performed. The image data and 3-D surface points can be assessed to distinguish and map the turbine blade edge and the shroud surface, and a distance will be computed between the edge and the surface. That distance will represent the turbine shroud gap measurement at various locations for the respective turbine blade. The tip clearance measurement may be performed, for example, using the process described in reference to FIG. 9 above.

At 1130, the shroud gap measurement for the respective turbine blade is recorded to a list of measurements completed thus far. The list can be stored in memory while the inspection is being performed on the remaining blades.

At 1135, the recorded value, representing the shroud gap measurement, is compared to minimum and maximum limits set by the inspection operator and/or the industry.

At 1140, a warning message is displayed if the recorded value, when compared to minimum and maximum limits, is found to be at a value of concern.

At 1145, a system check is performed to determine whether the blade measured at 1125 is the last blade to be measured in the turbine. If the check returns a negative, indicating the blade most recently measured is not the last unmeasured blade of the turbine, the system will proceed to 1115 and continue with the measurement process. If the check returns a positive, indicating the blade most recently measured was the last unmeasured blade of the turbine, the system will proceed to 1150.

At 1150, images relating to image data which was deemed, by the system, to fall outside of the maximum and minimum limits of 1135, are identified for review by the system operator, inspector, or other figure.

At 1155, the results of the series of shroud gap measurements are exported to file.

Figure 12:
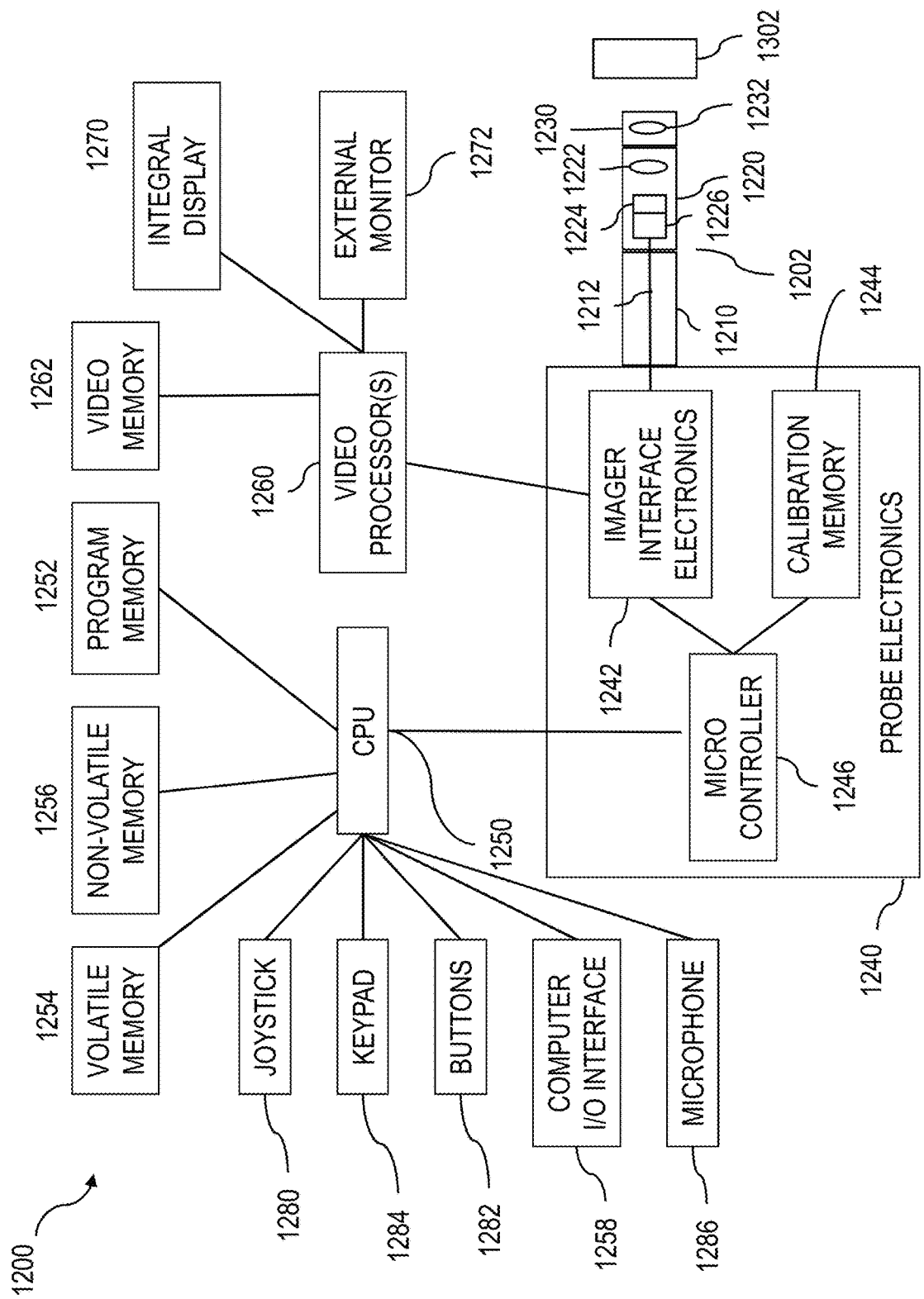
FIG. 12 is a block diagram of an exemplary video inspection device.

FIG. 12 is a block diagram of an exemplary video inspection device 1200. It will be understood that the video inspection device 1200 shown in FIG. 12. Is exemplary and that the scope of the invention is not limited to any particular video inspection device 1200 or any particular configuration of components within a video inspection device 1200.

Video inspection device 1200 can include an elongated probe 1202 comprising an insertion tube 1210 and a head assembly 1220 disposed at the distal end of the insertion tube 1210. Insertion tube 1210 can be a flexible, tubular section through which all interconnects between the head assembly 1220 an probe electronics 1240 are passed. Head assembly 1220 can include probe optics 1222 for guiding and focusing light from the viewed object 1302 onto an imager 1224. The probe optics 1222 can comprise, e.g., a lens singlet or a lens having multiple components. The imager 1224 can be a solid state CCD or CMOS image sensor for obtaining an image of the viewed object 1302.

A detachable tip or adaptor 1230 can be placed on the distal end of the head assembly 1220. The detachable tip 1230 can include tip viewing optics 1232 (e.g., lenses, windows, or apertures) that work in conjunction with the probe optics 1222 to guide and focus light from the viewed object 1302 onto an imager 1224. The detachable tip 1230 can also include illumination LEDs (not shown) if the source of light for the video inspection device 1200 emanates from the tip 1230 or a light passing element (not shown) for passing light from the probe 1202 to the viewed object 1302. The tip 1230 can also provide the ability for side viewing by including a waveguide (e.g., a prism) to turn the camera view and light output to the side. The tip 1230 may also provide stereoscopic optics or structured-light projecting elements for use in determining three-dimensional data of the viewed surface. The elements that can be included in the tip 1230 can also be included in the probe 1202 itself.

The imager 1224 can include a plurality of pixels formed in a plurality of rows and columns and can generate image signals in the form of analog voltages representative of light incident on each pixel of the imager 1224. The image signals can be propagated through imager hybrid 1226, which provides electronics for signal buffering and conditioning, to an imager harness 1212, which provides wire for control and video signals between the imager hybrid 1226 and the imager interlace electronics 1242. The imager interface electronics 1242 can include power supplies, a timing generator for generating imager clock signals, an analog front end for digitizing the imager video output signal, and a digital signal processor for processing the digitized imager video data into a more useful video format.

The imager interface electronics 1242 are part of the probe electronics 1240, which provide a collection of functions for operating the video inspection device. The probe electronics 1240 can also include a calibration memory 1244, which stores the calibration data for the probe 1202 and/or tip 1230. A microcontroller 1246 can also be included in the probe electronics 1240 for communicating with the imager interface electronics 1242 to determine and set gain and exposure settings, storing and reading calibration data from the calibration memory 1244, controlling the light delivered to the viewed object 1302, and communicating with a central processor unit (CPU) 1250 of the video inspection device 1200.

In addition to communicating with the microcontroller 1246, the imager interface electronics 1242 can also communicate with one or more video processors 1260. The video processor 1260 can receive a video signal from the imager interface electronics 1242 and output signals to various monitors 1270, 1272, including an integral display 1270 or an external monitor 1272. The integral display 1270 can be an LCD screen built into the video inspection device 1200 for displaying various images or data (e.g., the image of the viewed object 1302, menus, cursors, measurement results) to an inspector. The external monitor 1272 can be a video monitor or computer-type monitor connected to the video inspection device 1200 for displaying various images or data.

The video processor 1260 can provide/receive commands, status information, streaming video, still video images, and graphical overlays to/from the CPU 150 and may be comprised of FPGAs, DSPs, or other processing elements which provide functions such as image capture, image enhancement, graphical overlay merging, distortion correction, frame averaging, scaling, digital zooming, over laying, merging, flipping, motion detection, and video format conversion and compression.

The CPU 1250 can be used to manage the user interface by receiving input via a joystick 1280, buttons 1282, keypad 1284, and/or microphone 1286, in addition to providing a host of other functions, including image, video, and audio storage and recall functions, system control, and measurement processing. The joystick 1280 can be manipulated by the user to perform such operations as menu selection, cursor movement, slider adjustment, and articulation control of the probe 1202, and may include a push button function. The buttons 1282 and/or keypad 1284 also can be used for menu selection and providing user commands to the CPU 1250 (e.g., freezing or saving a still image). The microphone 1286 can be used by the inspector to provide voice instructions to freeze or save a still image.

The video processor 1260 can also communicate with video memory 1262, which is used by the video processor 1260 for frame buffering and temporary holding of data during processing. The CPU 1250 can also communicate with CPU program memory 1252 for storage of programs executed by the CPU 1250. In addition, the CPU 1250 can be in communication with volatile memory 1254 (e.g., RAM), and non-volatile memory 1256 (e.g., flash memory device, a hard drive, a DVD, or an EPROM memory device). The non-volatile memory 1256 is the primary storage for streaming video and still images.

The CPU 1250 can also be in communication with a computer I/O interface 1258, which provides various interfaces to peripheral devices and networks, such as USB, Firewire, Ethernet, audio I/O, and wireless transceivers. This computer I/O interface 1258 can be used to save, recall, transmit, and/or receive still images, streaming video, or audio. For example, a USB "thumb drive" or CompactFlash memory card can be plugged into computer I/O interface 1258. In addition, the video inspection device 1200 can be configured to send frames of image data or streaming video data to an external computer or server. The video inspection device 100 can incorporate a TCP/IP communication protocol suite and can be incorporated in a wide area network including a plurality of local and remote computers, each of the computers also incorporating a TCP/IP communication protocol suite. With incorporation of TCP/IP protocol suite, the video inspection device 100 incorporates several transport layer protocols including TCP and UDP and several different layer protocols including HTTP and FTP.

It will be understood that, while certain components have been shown as a single component (e.g., CPU 1250) in FIG. 12, multiple separate components can be used to perform the functions of the CPU 1250.

The subject matter described herein provides many technical advantages. For example, inspection efficiency may be substantially improved. Some applications require that many tens or even hundreds of blade shroud gaps be measured. With some traditional manual techniques, such as performing a point to plane type measurement, a minimum of 4 measurement cursors (three on the shroud to establish a plane, and a fourth on the blade edge) must be manually placed and often repeatedly adjusted in order to achieve an accurate measurement at a single point on the blade edge. To then determine the minimum, maximum, and average gap distances, one or more cursors would have to be manually and precisely positioned at multiple points along the blade edge. This process may take several minutes per blade whereas the automated measurement method described herein requires no manual cursor placement and quickly and automatically provides the minimum, maximum, and average results. In addition, while the existing manual measurement approach may offer a rendered point cloud view showing a set of 3-D surface points and graphical measurement icons to allow inspection for potential sources of inaccuracy, the initial orientation of the blade and shroud in that view is usually not conducive to performing that inspection. The user must therefore rotate the point cloud via an input device such as a touch screen, joystick, or mouse to achieve a more useful perspective. Some implementations of the current subject matter can automatically provides the preferred perspective upon completion of the automated measurement thus eliminating the time normally used to achieve that perspective.

Furthermore, some existing systems present the user with a white-light image on which cursors are manually positioned. As noted previously, such white-light images may show very little contrast between the blade edge and the shroud making it difficult for the user to precisely identify the position of the blade edge in the image. In some embodiments of the described subject matter, one or more structured light patterns may be projected from a position further from the shroud than the normal inspection light emission such that captured 2-D images of the structured light patterns show a dark shadow on the shroud side of the blade edge where the blade has blocked the structured light patterns. Thus, by using the 2-D structured light pattern images, possibly in combination with the 2-D white-light image, the automated processing can more easily and precisely identify the edge of the blade in the 2-D images.

Another example benefit of some implementations of the current subject matter is that it can reduce the impact of missing or noisy 3-D surface points along the edge of the blade. Because borescopes are very constrained in size, the 3-D data that may be generated using, for example, structured light patterns or stereoscopic imaging, often does not produce complete, high fidelity data along part edges such as a blade edge. This can be a problem with traditional manual measurements wherein a cursor is placed on a 2-D image pixel and the 3-D coordinate associated with that pixel is used to calculate the measurement result as it may prevent measurement at the desired location or reduce the accuracy of the measurement. In some implementations of the current subject matter, a surface fitting operation may be performed using a plurality of 3-D surface points on the surface of the blade in the vicinity of each blade edge pixel to determine a fitted surface. A 3-D blade edge point may then be determined by projecting the blade edge pixel onto that fitted surface. This may be done by computing the 3-D coordinate at which a 3-D viewing ray associated with the blade edge pixel, which may be described by equations such as $y(z)$ =A*z, x(z)=B*z where A and B are constants, intersects the fitted 3-D surface. Thus, by using a number of 3-D surface points that may include points outside of the edge region that most commonly includes noise or data gaps, a more complete and accurate 3-D mapping of the blade edge may be achieved.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:

receiving, by at least one processor of a computing system, data characterizing a plurality of two-dimensional images of a blade, including a blade edge and a blade surface, and a portion of a shroud, wherein each two-dimensional image of the plurality of two-dimensional images is captured at different brightness level;

combining, by the processor, the plurality of two-dimensional images to form a high-dynamic range (HDR) image including the blade, the portion of the shroud and a set of three-dimensional surface points characterizing the blade and the portion of the shroud, wherein each point in the set of three-dimensional surface points is associated with a pixel in each of the plurality of two-dimensional images;

determining, by the processor, a plurality of blade edge pixels at the blade edge;

determining, by the processor, a fitted shroud surface based on the three-dimensional surface points;

determining, automatically by the processor, a three-dimensional fitting of the blade surface in the vicinity of each blade edge pixel of the of plurality of blade edge pixels;

determining, by the processor, a plurality of three-dimensional viewing rays associated with the plurality of blade edge pixels;

determining, by the processor, a plurality of three-dimensional blade edge points at which the plurality of three-dimensional viewing rays intersect the three-dimensional fitting of the blade surface;

determining, by the processor, one or more distances between the plurality of three-dimensional blade edge points and the fitted shroud surface; and providing the one or more distances.

2. The method of claim 1, further comprising:

acquiring, by a borescope inserted into a turbine, one or more structured light images of the blade and the portion of the shroud;

acquiring, by the borescope, the plurality of two-dimensional images, wherein each of the plurality of two-dimensional images is a white-light image; and determining, based on the acquired structured light images, the set of three-dimensional surface points.

3. The method of claim 2 wherein determining the plurality of blade edge pixels includes performing edge detection on the HDR image and the one or more structured light images.

4. The method of claim 1, further comprising:

determining a line characterizing the blade edge, based on the plurality of blade edge pixels.

5. The method of claim 1, further comprising:

clustering the plurality of blade edge pixels to form segments;

determining a final blade edge segment from the segments and based on a number of pixels within each segment, the determining the final blade edge segment further based on pixel intensity values;

filtering the final blade edge segment; and determining, for each point in the filtered final blade edge segment, a three-dimensional edge point by at least projecting a position of a point in the filtered final blade edge segment onto a fitted three-dimensional blade surface.

6. The method of claim 1, wherein determining the one or more distances comprises determining a minimum distance, a maximum distance and an average distance.

7. The method of claim 1, wherein the providing includes:

displaying, within a first graphical user interface display space, one or more of plurality of two-dimensional images and first graphical icons characterizing a first location of a first blade edge pixel of the plurality of blade edge pixels within the one or more of plurality of two-dimensional images and a second location of the fitted shroud surface within the one or more of plurality of two-dimensional images; and displaying, within a second graphical user interface display space, a rendered three-dimensional image including the three-dimensional surface points and second graphical icons characterizing the first location and the second location.

8. The method of claim 1, wherein the receiving is performed by a borescope inserted into a port of a turbine that includes the blade and the shroud.

9. The method of claim 8, further comprising:

receiving, from a turning tool and by a borescope, an instruction indicating that the blade has rotated within a field of view of a camera of the borescope; and performing the receiving of the data characterizing the plurality of two-dimensional images, the determining of the plurality of blade edge pixels and the fitted shroud surface, and the determining of the distance in response to receiving the instruction.

10. The method of claim 9, further comprising:

transmitting an instruction to a turning tool to rotate another blade into a field of view of a camera of the borescope; and repeating, for the another blade, the receiving, the determining the plurality of blade edge pixels and the fitted shroud surface, and the determining the one or more distances.

11. The method of claim 9, wherein the turning tool includes an electronically controlled motor and wherein the turning tool is mechanically coupled to the turbine and configured to rotate blades of the turbine through the field of view of the camera of the borescope.

12. The method of claim 1 wherein the providing includes displaying within a graphical user interface display space, a rendered two-dimensional image representing a three-dimensional space that includes the surface points and graphical icons representing a first location of a first blade edge pixel of the plurality of blade edge pixels within the three-dimensional space.

13. The method of claim 1, wherein the providing includes displaying, within a graphical user interface display, a rendered two-dimensional image representing a three-dimensional space that includes the three-dimensional surface points and graphical icons representing the three-dimensional blade edge points within the three-dimensional space.

14. The method of claim 13 wherein at least one of the three-dimensional blade edge points does not match the three-dimensional coordinates of any of the three-dimensional surface points such that the graphical icons are displaced from the three-dimensional surface points in the rendered two-dimensional image.

15. The method of claim 1 wherein the providing includes displaying, within a graphical user interface display space, a rendered two-dimensional image representing a three-dimensional space that includes the three-dimensional surface points and graphical icons characterizing a first location of a first blade edge pixel of the plurality of blade edge pixels and wherein the three-dimensional surface points characterizing the portion of the shroud are automatically displayed in a consistent orientation relative to the three-dimensional surface points characterizing the blade regardless of the relative orientations of the blade and shroud in the rendered two-dimensional image.

16. A borescope system comprising an image sensor, a display, and a processor, wherein the at least one processor is configured to:

receive a plurality of two-dimensional images generated from data provided by the image sensor, the plurality of two-dimensional images including a blade, including a blade edge and a blade surface, and a portion of a shroud, wherein each two-dimensional image of the plurality of two-dimensional images is captured at different brightness level;

combining, by the processor, the plurality of two-dimensional images to form a high-dynamic range (HDR) image including the blade, the portion of the shroud;

compute, automatically, a plurality of three-dimensional surface points characterizing the blade and the portion of the shroud, wherein each point in the set of three-dimensional surface points is associated with a pixel in each of the plurality of two-dimensional images;

determine, automatically, a plurality of blade edge pixels at the blade edge;

determine, automatically, a fitted shroud surface based on the three-dimensional surface points;

determine, automatically, a three-dimensional fitting of the blade surface in the vicinity of each blade edge pixel of the plurality of blade edge pixels;

determine, automatically, a plurality of three-dimensional viewing rays associated with the plurality of blade edge pixels;

determine, automatically, a plurality of three-dimensional blade edge points at which the plurality of three-dimensional viewing rays intersect the three-dimensional fitting of the blade surface;

determine, automatically, one or more distances between the plurality of three-dimensional blade edge points and the fitted shroud surface;

provide the one or more distances to a display communicatively coupled to the borescope system.

17. The borescope system of claim 16, wherein the at least one processor is further configured to display, on the display, an image generated from data provided by the image sensor and graphical icons indicating a first location of a first blade edge pixel of the plurality of blade edge pixels.

\* \* \* \* \*